United States Patent Office 3,054,797
Patented Sept. 18, 1962

3,054,797
PROCESS FOR THE PREPARATION OF
5-AMINOHEXAHYDROPYRIMIDINES
Wilton O. Bell, Monroe, La., and Albert E. Neckar, Terre
Haute, Ind., assignors to Commercial Solvents Corporation, New York, N.Y., a corporation of Maryland
No Drawing. Filed Oct. 11, 1961, Ser. No. 144,301
5 Claims. (Cl. 260—256.4)

Our invention relates to the production of 5-aminohexahydropyrimidines. More particularly it relates to an improved process for producing 5-aminohexahydropyrimidines having the following formula:

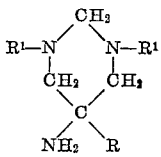

where R is lower alkyl and $R^1$ is alkyl.

5-aminohexahydropyrimidines can be prepared by the process described in U.S. Patent 2,387,043, issued to Murray Senkus. Briefly this process consists of subjecting a mixture of a 5-nitrohexahydropyrimidine, a nickel hydrogenation catalyst and a solvent to liquid phase hydrogenation at pressures above 500 pounds and at temperatures ranging from about 25 to about 100° C. and fractionally distilling the resulting hydrogenation product to recover the 5-aminohexahydropyrimidine.

5-aminohexahydropyrimidines produced by the above-described process are generally of poor color and purity. Therefore, in order to obtain a product having acceptable color characteristics and sufficient purity, it is necessary to employ not only expensive distillation equipment but to use repeated distillation procedures. The need for multiple distillations and the requirement of expensive and highly specialized equipment thus greatly increases the cost of the final product.

We have now discovered an improved process whereby 5-aminohexahydropyrimidines having the following formula:

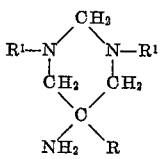

wherein R is lower alkyl and $R^1$ is alkyl having industrially acceptable color characteristics and degrees of purity can be produced without the necessity of repeated and expensive purification procedures. Thus, our new process represents a significant economic advancement in the production of 5-aminohexahydropyrimidines.

Our invention consists essentially of incrementally adding the 5-nitrohexahydropyrimidine to be reduced to a mixture of methanol and hydrogenation catalyst and hydrogenating the mixture while continuously maintaining a temperature of from about 25 to about 100° C. and a pressure in excess of 500 pounds.

Generally, in carrying out our invention, any hydrogenation catalyst which is active within the aforesaid temperature range may be employed. We have found it preferable, for the majority of purposes, to utilize Raney nickel as the hydrogenation catalyst. As previously stated, the reaction can be effected at hydrogen pressures ranging in excess of 500 pounds. We have found it preferable, however, to carry out the reaction at pressures not in excess of 1,000–1,200 pounds for at higher pressures there is tendency to cleave the hexahydropyrimidine ring. Also, as previously stated, temperatures ranging from about 25 to about 100° C. are suitable for our reaction. However, we prefer to utilize temperatures of from about 70 to about 100° C. Solvents which can be suitably utilized in the reduction procedure include the lower aliphatic alcohols such as methanol, ethanol, etc., and the like.

In order to achieve a product having optimum color characteristics and purity, it is preferable to cease hydrogenation on completion of the reaction which is indicated by failure of additional hydrogen adsorption. After completion of the reaction, the 5-aminohexahydropyrimidines can be purified by first separating the hydrogenation catalyst from the reaction mixture by filtration and then removing the solvent by distillation.

The following examples are offered to illustrate our invention. However, it is not intended that the invention be limited to the specific materials set forth; rather, it is intended that all equivalents apparent to those skilled in the art be included in the scope of the invention as described in this specification and the attached claims.

Example I

To a hydrogenation apparatus containing 500 ml. of methanol and 10 grams of Raney nickel catalyst were continuously added over a period of one hour, 240 grams of 5-nitro-1,3-bis(2-ethylhexyl)-5-methylhexahydropyrimidine. During the one-hour period, the resulting mixture was hydrogenated at approximately 1,000 pounds per square inch utilizing room temperature as the initial temperature and gradually increasing the temperature to about 70° C. At the end of the one-hour period, hydrogenation was stopped. The reaction mixture was first filtered to remove the catalyst and was then distilled at atmospheric pressure at a temperature of 70° C. to remove methanol. 197.5 grams of 5-amino-1,3-bis(2-ethylhexyl)-5-methylhexahydropyrimidine were collected. The collected material had a color of Gardner 2.

Example II allows a comparison of the color characteristics of 5-amino-1,3-bis(2-ethylhexyl)methylhexahydropyrimidine prepared according to Example I by the process of our invention with 5-amino-1,3-bis(2-ethylhexyl)-5-methylhexahydropyrimidine prepared using the prior art method. A comparison of the results shows the effectiveness of our process in producing a substantially colorless pure 5-amino-1,3-bis(2-ethylhexyl)-5-methylhydropyrimidine.

Example II

A mixture consisting of 240 grams of 5-nitro-1,3-bis-(2-ethylhexyl)-5-methylhexahydropyrimidine, 500 ml. of methanol, and 10 grams of Raney nickel catalyst was placed in a suitable hydrogenation apparatus and sealed. This mixture was then hydrogenated at a pressure of approximately 1,000 pounds per square inch using room temperature as the initial temperature. As the reduction proceeded, however, the temperature was gradually increased to approximately 80° C. Hydrogenation was continued for a period of about one hour at which time adsorption of hydrogen had ceased. Upon cessation of hydrogenation the reaction mixture was withdrawn from the hydrogenation apparatus, the catalyst removed from the solution by filtration, and the solution was distilled at atmospheric pressure at 70° C. to remove methanol. 193 grams of 5-amino-1,3-bis(2-ethylhexyl)-5-methylhexahydropyrimidine were collected. The material had a color of Gardner 8.

*Example III*

A portion of 5-nitro-1,3-dibenzyl-5-methylhexahydropyrimidine was subjected to hydrogenation following the procedure of Example I to obtain 5-amino-1,3-dibenzyl-5-methylhexahydropyrimidine. The color characteristic of the material was similar to that shown in Example I.

*Example IV*

A portion of 5-nitro-1,3-diisopropylhexahydropyrimidine was subjected to hydrogenation following the procedure of Example I to obtain 5-amino-1,3-diisopropylhexahydropyrimidine. The color characteristic of the material was similar to that shown in Example I.

*Example V*

A portion of 5-nitro-1,3,5-trimethylhexahydropyrimidine was subjected to hydrogenation following the procedure of Example I to obtain 5-amino-1,3,5-trimethylhexahydropyrimidine. The color characteristic of the material was similar to that shown in Example I.

Now having described our invention, what we claim is:

1. In a process for the production of 5-amino-hexahydropyrimidines of the formula:

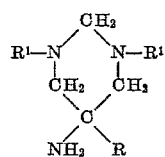

wherein R is lower alkyl and $R^1$ is alkyl of improved color by subjecting a 5-nitrohexahydropyrimidine to hydrogenation in the liquid phase in the presence of a hydrogenation catalyst at temperatures ranging from about 25 to about 100° C. and at pressures in excess of 500 pounds the improvement which comprises incrementally introducing the 5-nitrohexahydropyrimidine into the liquid phase hydrogenation reaction.

2. The process of claim 1 wherein the 5-aminohexahydropyrimidine is 5-amino-1,3-bis(2-ethylhexyl)-5-methylhexahydropyrimidine.

3. The process of claim 1 wherein the 5-aminohexahydropyrimidine is 5-amino-1,3-dibenzyl-5-methylhexahydropyrimidine.

4. The process of claim 1 wherein the 5-aminohexahydropyrimidine is 5-amino-1,3-diisopropylhexahydropyrimidine.

5. The process of claim 1 wherein the hexahydropyrimidine is 5-amino-1,3,5-trimethylhexahydropyrimidine.

No references cited.